April 3, 1951     D. H. RING     2,547,539
SIGNAL WAVE DUPLEXING SYSTEM
Filed June 27, 1946     2 Sheets-Sheet 1
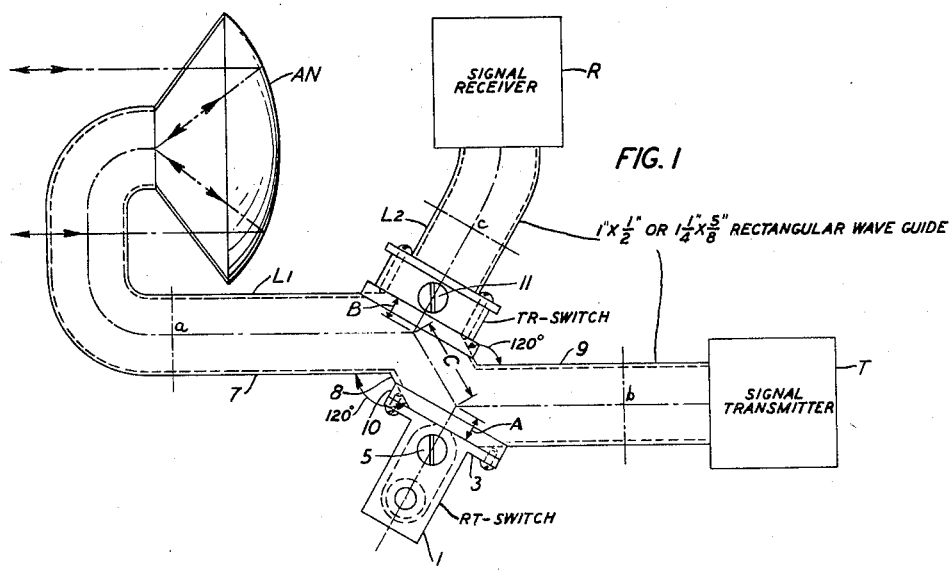
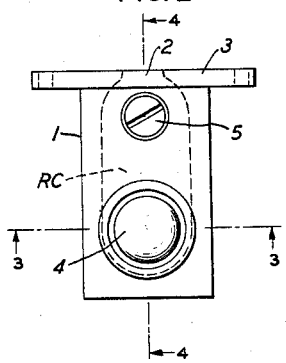
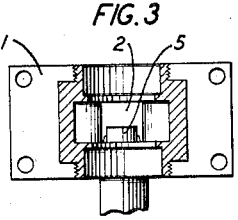
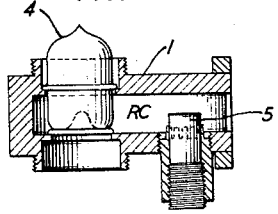
INVENTOR
D. H. RING
BY
*Earl C. Laughlin*
ATTORNEY April 3, 1951 D. H. RING 2,547,539
SIGNAL WAVE DUPLEXING SYSTEM
Filed June 27, 1946 2 Sheets-Sheet 2
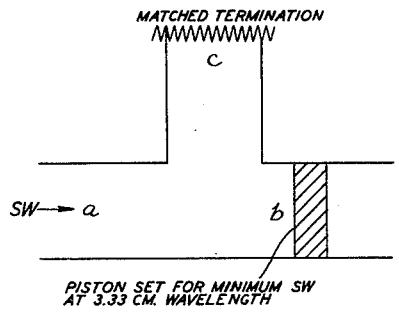
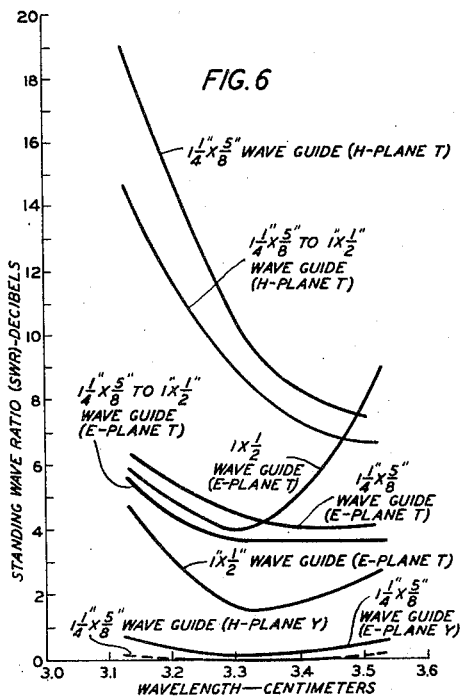
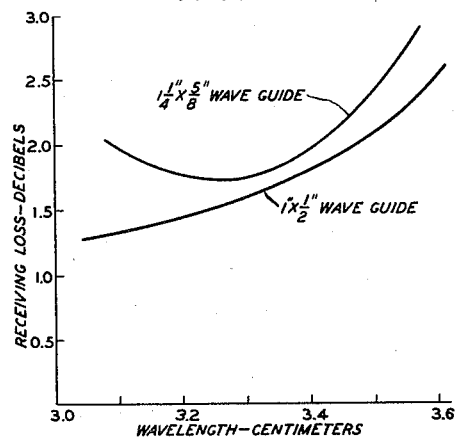
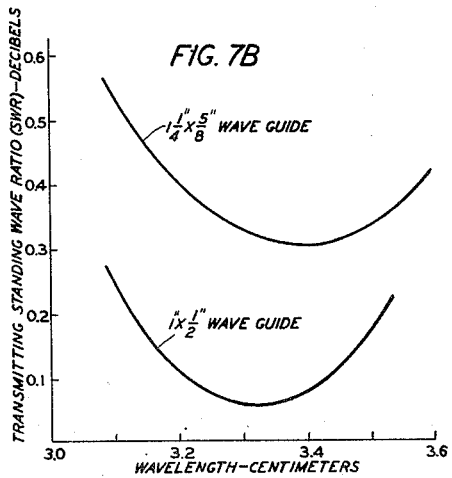
INVENTOR
D. H. RING
BY
Earl C. Laughlin
ATTORNEY Patented Apr. 3, 1951

2,547,539

UNITED STATES PATENT OFFICE 2,547,539

SIGNAL WAVE DUPLEXING SYSTEM

Douglas H. Ring, Red Bank, N. J., assignor to Bell Telephone Laboratories, Incorporated, New York, N. Y., a corporation of New York Application June 27, 1946, Serial No. 679,620

7 Claims. (Cl. 250—13)

This invention relates to a signal transmission system and particularly to a signal transmission system of the duplex type and to the coupling and switching arrangements employed with such a system.

One type of duplex signal transmission system to which the arrangements of the invention are particularly applicable is an object locating system of the pulse reflection type, for example, one employing ultra-high frequency or radio waves, commonly called a radar system. In the usual radar system, very short pulses of high frequency signal energy are generated and radiated by an antenna at an observation point into the surrounding air medium; returned pulses, which may be termed radio echoes, reflected from objects to be located in the medium, on which the radiated pulses impinge, are picked up by the same antenna and are detected in an associated tuned signal receiver; and the detected signal echoes are compared in a suitable indicating and measuring circuit with the outgoing signal pulses on a time basis to provide a measure of the distances to the objects causing the echoes.

Such systems may employ branching dielectric wave guides or coaxial lines for connecting the signal transmitter and the signal receiver to the common transmitting and receiving antenna, and usually include very sensitive transmission devices, such as crystal detectors in the signal receiver, which are of such nature that they might be destroyed or have their operation characteristics substantially impaired if subjected to the very high voltages necessarily employed for the outgoing signal energy. To protect such sensitive receiving devices from injury, and also to enable duplex operation, it is known to employ one or more signal-controlled switching arrangements for suitably controlling the transmission efficiencies of the branching transmitting and receiving lines during the transmitting and receiving signal intervals. The switching arrangements may include a device, which may be of the type usually referred to as a TR box or switch, operating to insert a protective loss of suitable value in the input of the signal receiver during pulse transmitting intervals only, and, for providing more efficient operation during signal receiving intervals, may include also a second device, which may be of the type known as an RT or ATR (anti-TR) box or switch, operating to effectively disconnect the signal pulse transmitter from the antenna during signal pulse receiving intervals only, so as to prevent loss of part of the received signal energy. A TR or RT box or switch may comprise a hollow, metal-walled chamber or cavity suitably dimensioned or otherwise constructed so as to be resonant at the frequencies of the signals transmitted and received by the duplex signaling system or radar to which it may be connected and a spark gap or a gas discharge tube connected across the chamber or cavity, adapted to discharge to effectively short circuit the cavity in its input in response to high amplitude signal wave energy of the resonant frequency entering the cavity and to remain in the undischarged condition in response to relatively low amplitude signal wave energy entering the cavity so as to permit the latter energy to be transmitted therethrough with little loss. Such devices are disclosed, for example, in the copending United States patent application of A. L. Samuel, Serial No. 474,122, filed January 30, 1943.

The general objects of the invention are to insure that the signal receiver in such a duplex signaling or radar system is protected from the necessarily high voltages of the outgoing signal wave energy during signal transmitting intervals; that the incoming signal wave energy is applied to the signal receiver with relatively little loss; that there is a minimum of attenuation between the signal transmitter or transmitting pulse generator and the common transmitting and receiving antenna, and that reflections at the branching point between the signal transmitting and signal receiving lines are reduced to a minimum.

A more specific object is to improve a duplex signal transmission system of the above-described type, particularly from the standpoint of making the switching arrangements effective over a wide range of high signaling frequencies.

Another object is to improve a switch of the resonant cavity-shunting gas discharge tube type so as to make it tunable over a wide band of ultra-high frequencies.

The improved duplex signaling or radar device in accordance with the invention comprises branching wave guide lines of optimum size connecting a signal transmitter and signal receiver to a common antenna and a TR-RT-switch tunable over a wide band of ultra-high signal frequencies, suitably coupled to the branching wave guide lines. In one embodiment, the main line connecting the ultra-high frequency signal transmitter (magnetron) to the common transmitting and receiving antenna comprises a section of dielectric wave guide line of small rectangular cross-section (say, 1 inch x ½ inch or 1¼ inches x ⅝ inch) including two spaced oppositely pointed, symmetrical 120-degree bends (i. e. having a 120-degree angle between the longitudinal axes of the wave guide portions on each side of the bend). A branch line consisting of a section of rectangular wave guide of the same cross-section connects the signal receiver to the main wave guide line at the bend nearest the antenna, a wave energy intensity-responsive switch of the resonant cavity-shunting gas discharge tube type is coupled to the main wave guide line at the apex of each of the bends in the magnetic plane (shunt electrical connection) and the length of wave guide lines between the center lines of the spaced bends and the location of each switch with respect to the opposite 120-degree wave guide corner of the main line are selected so as to provide optimum operation for the signal transmitting and receiving condition, respectively, of the system over a wide ultra-high signal frequency band.

A feature of the invention is an optimum design of resonant cavity-shunting gas discharge switch suitable for use over a wide band of ultra-high frequencies.

The various objects and features of the invention will be better understood from the following detailed description when read in conjunction with the accompanying drawings in which:

Fig. 1 shows a signal transmission system of the duplex type employing branching wave guide lines, embodying the invention;

Figs. 2 to 4 show respectively an exterior side view and sectional views of the RT-switch employed in the system of Fig. 1;

Fig. 5 shows diagrammatically the method used for testing wave guide branching circuits to determine the optimum arrangement for use in the system of Fig. 1; and Figs. 6 and 7A and 7B show curves respectively illustrating the results of tests made to determine the optimum size and type of branching of the wave guide lines to be used in the duplexing system of Fig. 1, and the performance of that system.

The first problem encountered in the development of a tunable broad band TR-RT-switch for use over a wide band of ultra-high frequencies in a duplexing system is essentially one of designing a three-way branching circuit which will look like a smooth line from the signal transmitter (magnetron) to the antenna when a piston or short circuit is properly located in the receiver line, and like a smooth line from antenna to receiver when a piston or short circuit is placed in the transmitter line.

The TR-RT-broad band switch in accordance with the invention to be described was devised for providing proper operation for such a duplexing system employing branching wave guide lines, over a wide frequency range in the wavelength region near 3 centimeters, for example, a 12 per cent band at 3.3 centimeters wavelength. To determine the optimum size of wave guide lines to be employed for connecting the ultra-high frequency signal transmitter and the signal receiver to the common transmitting and receiving antenna, and the optimum type of branching of these lines to be used, a number of T type and 120-degree symmetrical Y type branching arrangement or junction of wave guides with branching in both the electric and magnetic planes were made up with 1¼ inches x ⅝ inch and 1 inch x ½ inch rectangular wave guide and combinations of these sizes. A 120-degree symmetrical Y type branching arrangement or junction of wave guides is one comprising three straight wave guides joined at a common point so that the longitudinal axis of each guide is at an angle of 120 degrees with respect to the longitudinal axis of each of the other two guides. A junction of two wave guides in the electric plane, to be referred to hereinafter as the E-plane, i. e., in the plane parallel to the lines of electric intensity in both joined guides, is equivalent to a series electrical connection. A junction of two wave guides in the magnetic plane, to be referred to hereinafter as the H-plane, i. e., the plane parallel to the lines of magnetic intensity and, therefore, perpendicular to the lines of electric intensity, in both joined guides, is equivalent to a shunt or parallel electrical connection.

All of these branching arrangements were tested in the manner illustrated diagrammatically in Fig. 5 by measuring the standing wave ratio (SWR) at the point $a$ in one of the branched wave guides with a termination at the point $c$ in the other wave guide branch and a piston at the point $b$ in the first wave guide branch. With the piston adjusted for minimum standing waves at 3.33 centimeters wavelength, measurements were made over the 12 per cent band. The measured values of standing wave ratio (SWR) in decibels for each branching arrangement tested are plotted against wavelength in centimeters in Fig. 6 of the drawing. It will be noted from the curves of Fig. 6, that, in general, none of the T branching arrangements provides sufficient promising results to be suitable for a 12 per cent band. It will be also noted that the E-plane Y branching arrangements showed a standing wave at about 0.6 decibel at the edges of the band, while the H-plane Y was within the accuracy of the termination used over the whole band (the terminations used in this work had 0.25 decibel standing wave over the band, and the standing wave figures given, therefore, may be in error by ±0.3 decibel). These results leave no doubt that the Y branching arrangements are superior to the T branching arrangements for wide band use. The H-plane Y branching arrangement of wave guides was chosen for use in the duplexing system of the invention as shown in Fig. 1, because it is slightly easier to work with mechanically.

After considerable experimenting with cavities of various shapes and sizes, the particular design of resonant cavity illustrated in Figs. 2 to 4 was arrived at as suitable for an RT-switch tunable over a 12 per cent band at 3.3 centimeters wavelength. Fig. 2 shows an exterior side view of the switch and Figs. 3 and 4 show sectional views taken along the lines 3—3 and 4—4, respectively, in Fig. 2, drawn full scale. The switch as shown in these figures comprises a box 1 closed at one end and with an iris opening or window 2 at the other end, providing an inner chamber or cavity RC rounded at the ends. The flange 3 at the open end of the box 1 is provided for attaching the switch to the wave guide system with which it is to be used. As shown in Fig. 4, a gas discharge tube 4 having its two discharge electrodes electrically contacting opposite sides of the chamber RC so as to define a spark gap thereacross, is located at the center of the arc bounding the closed end of the chamber RC, and a tuning plug 5 adapted to be screwed through one side wall of the box 1 into the resonant cavity RC to different depths of penetration for varying the tuning, is located at the center of the arc bounding the other end of the box, containing also the iris or window 2 used for coupling the switch to the main wave guide in the duplexing system of the invention illustrated in Fig. 1. This was done to simplify tube replacement in the model illustrated, but this iris may be located in the tube end of the cavity. The inside dimensions of the enclosed chamber RC and the size of the iris 2 were selected to make the chamber resonant at the desired ultra-high frequency and to provide an effective length for the chamber RC of one wavelength at the resonant frequency; and the dimensions of the portion of the tuning plug 5 extending into the chamber RC were selected so as to enable adjustment for different plug positions in the cavity, of the resonant frequency of the latter over the desired ultra-high frequency band, which in the system for which the switch was designed was from 3.1 to 3.5 centimeters wavelength.

When this RT-switch was attached by means of a Y H-plane junction to the wave guide system with which it is to work, in the manner shown in Fig. 1 to be described later, it was tuned up so that minimum power passed the junction into a termination. The standing wave looking into this circuit is taken as a measure of the efficiency of the RT-switch. This standing wave is, of course, a function of the Q of the switch and also of the iris opening. The size of the iris opening 2 was adjusted until standing wave ratios of the order of 20 decibels were realized over the tuning band. It was found that the tuning plug 5 projected approximately 1/64 inch into the cavity RC at 3.13 centimeters wavelength and 1/8 inch at 3.53 centimeters wavelength tuning, a range of about 0.109 inch. In tuning, it was necessary to adjust the plug projection to an accuracy of less than .001 inch.

In the duplexing system of the invention shown in Fig. 1, the signal transmitter T is connected to the common transmitting and receiving antenna AN by a main line L1 comprising three sections 7, 8 and 9 of wave guide of rectangular cross-section having the transverse dimensions, 1 inch x 1/2 inch or 1 1/4 inches x 5/8 inch, shown with the wide transverse dimension, 1 inch or 1 1/4 inches in the plane of the paper. The signal transmitter T may be a pulse generator of the magnetron type generating recurring pulses of ultra-high frequency energy, such as disclosed, for example, in United States Patent No. 2,063,342, issued December 8, 1936, to A. L. Samuel. The antenna AN is shown as being of the parabolic reflector type, but may comprise a horn or any other suitable type of antenna. The three wave guide sections 7, 8 and 9 of the main line L1 are disposed end to end with the central section 8 electrically connecting the two end sections 7 and 9, and the longitudinal axis of the central section 8 at an angle of 120 degrees with respect to the longitudinal axis of the end section 7 and the end section 9, respectively.

An RT-switch essentially like that illustrated in Figs. 2 to 4 and described above, is attached, as shown in Fig. 1, by its flange 3 to a corresponding flange 10 in the main guide line L1 at the junction point of the two wave guide sections 8 and 9, nearest the transmitter T, so that the resonant cavity RC of this RT-switch is coupled by its input iris 2 and a corresponding slot in the short side of the main wave guide line L1, i. e., that having the smallest transverse dimension, 1/2 inch or 5/8 inch, to the interior of that line, symmetrically with respect to the center line of that junction. This provides a 120-degree symmetrical Y branching connection of the RT-switch and the main guide line in the H-plane, corresponding to a shunt electrical connection, with the longitudinal axis of resonant cavity RC of the switch forming the stem of the Y.

The signal receiver R, which may be of the tuned superheterodyne type including one or more wave amplifiers and detectors and a measuring circuit or signal reproducer, is connected through the branch wave guide line L2, also of rectangular cross-section having the transverse dimensions, 1 inch x 1/2 inch or 1 1/4 inches x 5/8 inch, the longer transverse dimension, 1 inch or 1 1/4 inches, of which is in the same plane as the longer transverse dimension of the main wave guide line L1, i. e., in the plane of the paper, and the resonant cavity of a TR-switch to the main wave guide line L1 at the junction of the two wave guide sections 7 and 8, nearest the antenna A, also in the H-plane. The particular TR-switch illustrated and used in the tests to be described later, was of a known type comprising a metal-walled box enclosing a gas-filled resonant chamber or cavity with a glass-covered iris window at each end thereof, respectively electrically coupling the chamber to the main wave guide line L1 through a correspondingly located slot in the short side of the latter (wall having the smaller transverse dimension, 1/2 inch or 5/8 inch) and to the other branch wave guide line L2; two spark-gap electrodes (not shown) connected to opposite inner walls of the chamber; and a tuning plug 11 adapted to be screwed through the outer wall of the box to different penetrations into the chamber to adjust its tuning over the desired frequency range. The longitudinal axis of the branch wave guide line L2 and the TR-switch coincide with the center line of the 120-degree junction between the wave guide sections 7 and 8 of the main wave guide line L1. The dimensions of the inner chamber or cavity and of the two iris openings at the end of the cavity in the TR-switch would be selected to make the cavity resonant at the frequency of the outgoing signals generated by the transmitter T, and the incoming signals received from the antenna AN.

Any other of the several known types of TR-switch may be utilized in place of the switch shown in Fig. 1, or a switch identical with the RT-switch illustrated in Figs. 2 to 4 except for the substitution of two smaller end irises for the large input iris and the end wall, respectively, of the latter switch, may be employed.

In the duplexing system of the invention shown in Fig. 1, there are three critical dimensions indicated as A, B and C. The dimensions A and B determine the performance of the system in the transmitting case when the ideal is no standing wave in the main line. The dimension A is the distance from the point of intersection of the center lines of the wave guide sections 8 and 9 to the point on the longitudinal axis of the RT-switch at which the short circuit across its resonant cavity occurs when the associated gas tube 4 is fired by the resonant voltage applied by the portion of the high amplitude outgoing signal energy entering that cavity through its input iris 2 during each signal transmitting interval. Similarly, the dimension B is the distance from the point of intersection of the center lines of the wave guide sections 7 and 8 to the point on the longitudinal axis of the TR-switch at which the short circuit across its resonant cavity occurs when that switch is fired by the resonant voltage applied by the portion of the high amplitude outgoing signal entering that cavity through its input iris during each signal transmitting interval. The short circuiting points of the RT- and TR-switches are approximately in the planes of the coupling irises. With the particular RT- and TR-switches used in the system of Fig. 1, it was found that the short circuits are not exactly at the outer walls of the cavities, but the RT short was about 2/64 inch to 3/64 inch inside the front face. The critical dimensions A and B are functions of wave guide size and wavelength, and also depend to a small extent on the design of the TR and RT cavities respectively. They are best determined by experiment, the criterion being zero standing wave from transmitter T to antenna AN when the switches are fired. The measurements made on the system of Fig. 1 indicated that, for true short circuits in the walls of the guides, the critical dimensions A and B are independent of frequency over the 12 per cent band at 3.3 centimeters wavelength.

The dimension C determines the performance of the duplexing system in the receiving case when minimum loss from the antenna AN to the receiver R and maximum decoupling of the transmitter T are the objectives. This dimension was determined experimentally. It is obvious from consideration of symmetry that the RT-switch and the TR-switch are, in effect, located on the main line L1 at the center points of the associated wave guide Y junctions. One would expect C to be approximately equal to an odd multiple of $\lambda g/4$. The Y structure excludes the possibility of using $\lambda g/4$ so the next shortest value, $3\lambda g/4$, was chosen as the approximate value for C.

Experiments indicated that the proper values for A, B and C for a system using 1 inch x ½ inch rectangular wave guide and 1¼ inches x ⅝ inch rectangular wave guide are as given in the following table:

| Size of Wave Guide | A | B | C |
|---|---|---|---|
| | Inches | Inches | Inches |
| 1 inch x ½ inch | 19/64 | 19/64 | 1½ |
| 1¼ inch x ⅝ inch | 24/64 | 26/64 | 1 5/16 |

It will be noted that all components of the TR—RT-switch illustrated in Fig. 1 are either tunable or substantially independent of frequency except for the distance C. Therefore, the problem of optimizing such a system for a given frequency band is reduced to one of determining the best value of C, and, conversely, the limiting factor in extending the bandwidth is the change in the required value of C at the edges of the band from a fixed mid-band value.

In the transmitting condition of the duplexing system of Fig. 1 both the TR- and RT-switches are fired by the outgoing high amplitude signal energy. The resultant short circuit produced across the input of the resonant cavity of the RT-switch will cause substantially all of the outgoing signal energy to be transmitted over the main line L1 past the point of connection of the RT-switch thereto toward the TR-switch and the antenna AN. The short circuit produced across the input of the resonant cavity of the TR-switch will effectively shunt the input to the receiver line L2 so as to reduce the amount of the outgoing signal energy transmitted to the receiver to a relatively small value. In the receiving condition of the duplexing system the power in the relatively low amplitude signal energy incoming over the line L1 from the antenna AN will be insufficient to fire either the TR- or RT-switch which will remain tuned, and the RT-switch is effective to shunt the transmitter line so that substantially all of the incoming signal energy passes through the resonant cavity of the TR-switch and the branch line L2 to the receiver R.

The curves of Figs. 7A and 7B show test results indicating the performance of the duplexing system of Fig. 1. The curves of Fig. 7A show the measured receiving loss plotted against wavelength for the optimum values of the spacing C given above for 1¼ inches x ⅝ inch and 1 inch x ½ inch rectangular wave guide. This is the chief measure of receiving performance. The curves of Fig. 7B show measured transmitting standing wave ratio (SWR) plotted against wavelength for the optimum values of the spacing C for the 1¼ inches x ⅝ inch and 1 inch x ½ inch wave guides. This is the SWR seen from the magnetron transmitter T looking into the TR-RT-switch when both portions of the switch are fired and is the chief measure of transmitting performance.

As far as low power performance is concerned, the TR-RT-switch illustrated in Fig. 1 and described above, can be tuned over the 12 per cent band at 3.33 centimeters without significantly inferior performance to that which would be obtained from an optimum narrow band system. This is true whether the main line is made from large or small wave guide although the small wave guide is measurably superior.

Various modifications in the switches and duplex system illustrated and described which are within the spirit and scope of the invention will occur to persons skilled in the art.

What is claimed is:

1. In combination in a signal duplexing system, a signal transmitter, a signal receiver, a common transmitting and receiving antenna, a wave guide line connecting said transmitter to said antenna, said wave guide line including two oppositely disposed 120-degree angle bends spaced from each other along the line and a switch of the resonant cavity-shunting spark gap type respectively coupled to said line at each of said bends in such manner as to form with the two wave guide line portions extending to opposite sides of the bend a symmetrical 120-degree Y type branching connection, said signal receiver being connected to said wave guide line through the resonant cavity of one of said switches.

2. In combination in a signal wave duplexing system, a signal wave transmitter, a signal wave receiver, a common transmitting and receiving antenna, a wave guide line connecting said transmitter to said antenna, said line having two oppositely disposed 120-degree angle bends spaced from each other along said wave guide line and two wave energy intensity-responsive switches for controlling duplex operation of said system each comprising a tunable resonant cavity and a gas discharge tube shunted across the cavity, one of said switches being coupled through its resonant cavity to said wave guide line in the magnetic plane at each of said bends in such manner as to form with the wave guide portions extending to opposite sides of the bend a symmetrical 120-degree Y branching connection, said signal receiver being connected to said wave guide line through the resonant cavity of the one of said switches located nearest said antenna.

3. A wave duplexing system comprising a signal transmitter, a signal receiver, a common transmitting and receiving antenna, a main line comprising dielectric wave guide of elongated rectangular cross-section, including two spaced 120-degree angle bends, connecting said transmitter to said antenna, two wave energy intensity-responsive switches each comprising a tunable resonant cavity having an input iris, and a gas discharge tube in shunt with the cavity, one of said switches being symmetrically coupled to a face of the main wave guide line having the shorter transverse dimension by its input iris at each of said bends and a branch wave guide line also of elongated rectangular cross-section having its longer and shorter transverse dimensions respectively disposed in the same plane as the corresponding transverse dimensions of said main wave guide line, connecting said signal receiver to said main wave guide line through the resonant cavity of the switch at the bend in that line located nearest said antenna, the resonant cavity of the switch at the other of said bends being effectively one wavelength long at the resonant frequency and being closed at its outer end, the length of wave guide line between the center lines of the two 120-degree angle bends and the distance of the input iris of each switch from the opposite wave guide corner of the associated 120-degree bend being selected so as to provide optimum operation of the duplexing system over a wide range of ultra-high signaling frequencies.

4. In combination in a wave duplexing system, a high frequency signal transmitter, a signal receiver, a common transmitting and receiving antenna, a main line connecting said transmitter to said antenna, comprising three sections of dielectric wave guide of rectangular cross-section, disposed end to end with the longitudinal axis of the middle, interconnecting section at an angle of 120-degrees with respect to the longitudinal axis of each of the two end wave guide sections, a switch of the resonant cavity-shunting gas discharge tube type coupled symmetrically in the magnetic plane to the main wave guide line at each junction of the wave guide sections therein, and a branch wave guide line also of rectangular cross-section with its transverse dimensions in the same magnetic plane as the corresponding transverse dimensions of the main wave guide line, having one end connected to said signal receiver and the other end connected to said main wave guide line through the resonant cavity of the switch at the junction of the wave guide sections in that line nearest said antenna, the length of wave guide line between the center lines of the two 120-degree wave guide junctions in said main line and the location of the switch at each junction with respect to the opposite 120-degree wave guide corner of the main line being selected to provide optimum duplex operation of said system for a given wide band of high signaling frequencies.

5. A duplexing system comprising a high frequency signal transmitter, a signal receiver, a common transmitting and receiving antenna, a main line connecting said transmitter to said antenna, said main line comprising three sections of wave guide of the same rectangular cross-section, joined end to end and disposed so that the longitudinal axis of the middle interconnecting section is at an angle of 120-degrees with respect to the longitudinal axis of each of the two end sections, a branch line of rectangular cross-section having its transverse dimensions in the same plane as the corresponding transverse dimensions of the three wave guide sections of said main line, connected at one end to said signal receiver and two switches each including a resonant cavity tunable over a wide band of high frequencies corresponding to the range of signal frequencies to be transmitted and received by said duplexing system, and a gas discharge tube connected across the cavity and adapted to be discharged in response to high amplitude waves of the resonant frequency applied to the input thereof, such as the outgoing signals which would be produced by said signal transmitter, to short-circuit said cavity in its input, and to remain undischarged in response to low amplitude waves of the resonant frequency applied to the input of the cavity, such as the incoming signals which would be received over said main line from said antenna, the resonant cavity of a different one of said switches being coupled in the magnetic plane to said main line at each of the junctions of its wave guide sections, the other end of said branch line being connected to said main line through the resonant cavity of the one of said switches at the junction of the wave guide sections nearest the antenna, the length of wave guide line between the center lines of the junctions in said main line and the distances of the intersection of the center lines of each two joined wave guide sections in the main line from the short-circuiting point in the resonant cavity of the associated switch being selected to provide optimum operation for the duplexing system over said range of high signaling frequencies.

6. The system of claim 3, in which 1 inch x $\frac{1}{2}$ inch rectangular wave guide is employed in said main line and in said branch line, and the distance between the center lines of the two 120-degree angle bends along the longitudinal axis of the connecting portion of wave guide line is approximately one and one-half inches, and the distance between the input iris of the switch at the bend in said main line nearest the antenna and between the input iris of the switch at the bend nearest the signal transmitter, respectively, and the opposite wave guide corner in said main line are approximately $^{52}/_{64}$ inch and $^{51}/_{64}$ inch, respectively, so as to provide optimum duplex operation for any signal frequency in a 12 per cent band at 3.3 centimeters wavelength.

7. The system of claim 3, in which 1½ inches x ⅝ inch rectangular wave guide is used in both said main line and said branch line, and to provide optimum duplex operation over a 12 per cent band at 3.3 centimeters wavelength, the distance between the center lines of said two 120-degree angle bends along the longitudinal axis of the connecting section of wave guide is made approximately one and five-sixteenth inches and the distance between the input iris of the switch at the bend nearest the antenna and of the switch at the bend nearest the transmitter, respectively, and the opposite wave guide corner is made approximately $1^{3}/_{64}$ inches and 1¼ inches, respectively.

DOUGLAS H. RING.

REFERENCES CITED

The following references are of record in the file of this patent:

UNITED STATES PATENTS

| Number | Name | Date |
| --- | --- | --- |
| 2,362,561 | Katzin | Nov. 14, 1944 |
| 2,396,044 | Fox | May 5, 1946 |
| 2,412,161 | Patterson | Dec. 3, 1946 |
| 2,412,315 | Brown | Dec. 10, 1946 |
| 2,422,190 | Fixke | June 17, 1947 |
| 2,425,379 | Lindenblad | Aug. 12, 1947 |